United States Patent [19]  
Davis

[11] 4,109,234  
[45] Aug. 22, 1978

[54] ANTI SKID FAULT DETECTION CIRCUIT
[75] Inventor: William F. Davis, Tempe, Ariz.
[73] Assignee: Motorola, Inc., Schaumburg, Ill.
[21] Appl. No.: 662,053
[22] Filed: Feb. 27, 1976
[51] Int. Cl.² ............................................. B60T 8/00
[52] U.S. Cl. .................................. 340/52 B; 303/92; 340/661
[58] Field of Search ............... 340/52 R, 52 B, 248 A; 303/92

[56] References Cited  
U.S. PATENT DOCUMENTS

| | | | |
|---|---|---|---|
| 3,641,546 | 2/1972 | Blackburn | 340/248 A |
| 3,825,307 | 7/1974 | Carr et al. | 303/21 AF |
| 3,917,359 | 11/1975 | Sapir | 303/21 AF |
| 3,930,687 | 1/1976 | Amano | 303/21 AF |

Primary Examiner—John W. Caldwell, Sr.  
Assistant Examiner—Joseph E. Nowicki  
Attorney, Agent, or Firm—Michael D. Bingham

[57] ABSTRACT

Fault detection circuit which is intended to be included in an anti-skid control system for a braking system of a motor vehicle. The fault detection circuit is coupled between the sensor coil and tachometer portion of the anti-skid control system and detects if the sensor coil becomes: open circuited, shorted to ground, or shorted to a power supply. If any of the aforementioned conditions arise, the fault detection circuit provides an output signal for indicating such a condition to warn the driver of the vehicle that the anti-skid control system is non operative. A low pass RC filter is utilized to limit the input signal amplitude developed across the sensor coil to a constant value which is determined by the time constant of the low pass filter. Upper and lower references voltages can be established and compared to the filter input signal to indicate failure if this voltage developed across the sensor coil approaches either the upper or lower reference voltage.

5 Claims, 3 Drawing Figures

ANTI SKID FAULT DETECTION CIRCUIT

BACKGROUND OF THE INVENTION

This invention relates to a fault detection circuit and more particularly to a fault detection circuit suitable for detecting faults in the sensor circuitry of an anti-skid control braking system and indicating the same to a driver of a motor vehicle having such braking system.

Increasing demands have been placed on the safety of the operation of motor vehicles. In response to these demands, industries have placed great emphasis to finding ways to improve the braking system of motor vehicles. As a result, a system providing dynamic control of the braking operation has been developed for preventing noncontrolled skidding caused by excessive braking of the vehicles wheels overcoming the frictional forces between the tires of the vehicle of the road surface. These types of braking systems are known in the industry as anti-skid control systems.

Briefly, the anti-skid control system includes a sensor coil fixedly mounted to each wheel, and a magnetic breaker element which rotates at the rotational velocity of the wheels. The sensor coil and the magnetic breaker element cooperate to provide an output signal of which the magnitude and frequency is related to the rotational velocity of each wheel. The output signal from the sensor coil is applied to other circuitry which electronically controls the braking force applied to the wheels when slowing the vehicle. Thus, the anti-skid control system prevents uncontrolled skids from occurring because of too much braking force being applied to the wheels.

It is contemplated that after a period of time to adjust to the operation of such anti-skid control systems, that drivers of vehicles having these systems will rely on them to control the braking of the vehicles. Since the anti-skid control system is employed to override too much pressure being mechanically applied by the driver to the brakes, safer operation of vehicles is envisioned. However, if for some reason the anti-skid control system becomes inoperable due, for example, the sensor coil being open circuited or shorted either to a ground reference potential or to a power supply potential, disasterous results could result. The driver, being psychologically conditioned to expect the anti-skid control system to control the braking operation, could unknowingly apply too much force to the brake which could cause the vehicle to skid. Moreover, as the anti-skid control system provides for quicker stopping, a driver relying on an undetected system failure might not allow enough braking distance to prevent a collision of some sort. Therefore, a need exists to provide a fault detection circuit to warn the driver when the anti-skid control system is inoperable so that the driver can rely on the mechanical braking system and adjust accordingly.

SUMMARY OF THE INVENTION

Accordingly, it is an object of the present invention to provide an improved fault detection circuit.

It is a further object of the invention to provide a fault detection circuit suitable to be utilized in an anit-skid control system for motor vehicles or the like.

Another object of the invention is to provide an anti-skid fault detection circuit suitable to be fabricated in monolithic circuit form and to be included in an anti-skid control braking system to detect faults which may be generated therein and for indicating the presence of such faults.

The foregoing and other objects are achieved in accordance with the present invention by providing a fault protection circuit suitable to be employed in an anti-skid control system which includes means adapted to be coupled to a sensor coil for establishing an input voltage within a predetermined range, the magnitude of which is indicative of the voltage appearing across the sensor coil until a predetermined input frequency is reached which thereafter remains essentially constant, and means for sensing when the magnitude of the input voltage exceeds the predetermined range either in a positive or negative sense, to indicate a fault in the anti-skid control system.

DESCRIPTION OF THE EMBODIMENT OF THE INVENTION

Figure 1:
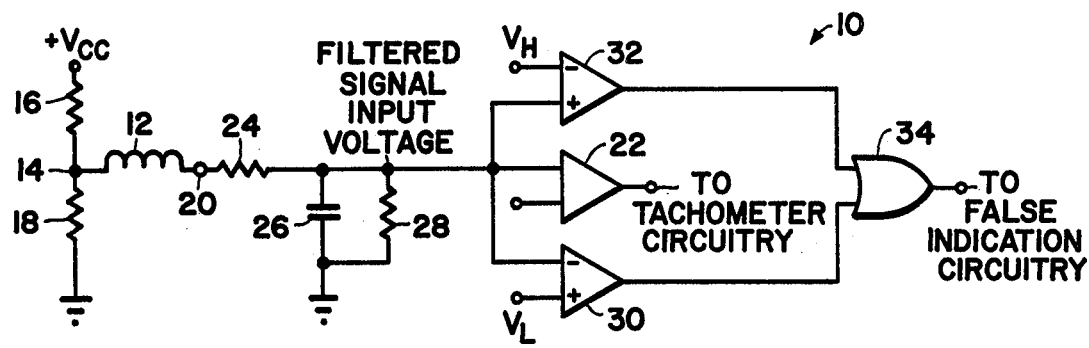
FIG. 1 illustrates a functional partial schematic and block diagram of a anti-skid fault detection circuit of the present invention.

Referring to the figures there is shown fault detection circuit 10 of the present invention. Fault detection circuit 10 is intended to be included between the sensing apparatus and tachometer circuitry comprising an anti-skid control system.

As is known, associated with each wheel of a vehicle employing anti-skid control apparatus, there is provided means for sensing the angle or speed of the wheels including a magnetic element. The magnetic element is usually shaped with an edge of rectangular sawtooth geometry. Typically, the magnetic element is fixedly attached to each wheel. The sensing means also comprises a sensor coil, illustrated in FIG. 1 by reference numeral 12, fixedly mounted to the frame of the vehicle. In prior art systems, one terminal of a sensor coil is usually reference to a ground potential and the other terminal thereof coupled to tachometer circuitry as is understood.

Although some present anti-skid control systems include circuitry for preventing the malfunction thereof, if the sensor coil should become shorted at either end thereof to ground or opened circuited the anti-skid control system would become inoperable. If this were to happen, an indication of such should be provided to the driver so that he would rely on the mechanical braking system and not the anti-skid control system.

Fault detection circuit 10 provides an indication of failure at the sensor coil to warn the driver of such as will now be explained. Sensor coil 12 is adapted to be connected at junction 14 between resistor 16 and 18 which form a divider network for establishing a reference voltage at junction 14. For example, the voltage derived at junction 14 may be one-half the value of a power supply voltage supplied to the resistive divider. The power supply voltage ($V_{CC}$) may be derived from a voltage regulator output terminal or from a battery. Sensor coil 12 acts as an inductive transducer and senses the time varying magnetic field produced by the magnetic element passing thereby as the wheel rotates.

In prior art systems, the voltage amplitude induced across sensor coil 12 may be in the form of a sinusoidal wave, the frequency of which is proportional to the change in rotational speed of the wheel. The voltage wave appearing across sensor coil 12 which is derived at junction 20 is then applied to the tachometery circuit of prior art systems which may include amplifier 22 (FIG. 1).

In the present embodiment of the invention, the terminal of sensor coil 12 connected to junction 20 is coupled through low pass filter network comprising resistor 24, capacitor 26 and resistor 28. The output of the low pass filter network is a filtered input signal voltage that is applied to the inverting input terminal of comparator 30 and to the noninverting terminal of comparator 32. The output of comparators 30 and 32 are connected to input terminals of OR gate 34 at which a fault detection output signal is produced at the output thereof. The noninverting input terminal of comparator 30 is biased at a low reference voltage level ($V_L$) and the inverting input terminal of comparator 32 is biased at a high reference voltage potential ($V_H$). The bias potential, $V_L$ and $V_H$, can be provided by a resistive network coupled to $V_{CC}$ or from the tachometer circuitry as is understood.

Figure 2:
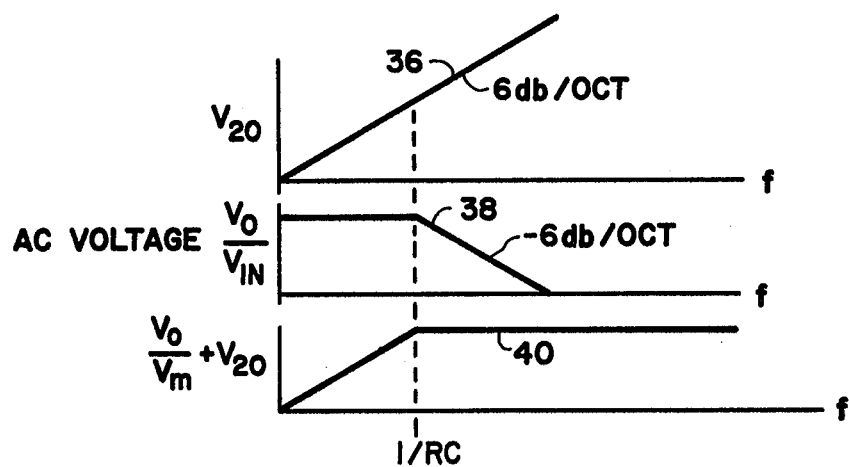
FIG. 2 shows transfer functions useful in explaining the operation of the embodiment of FIG. 1.
Figure 3:
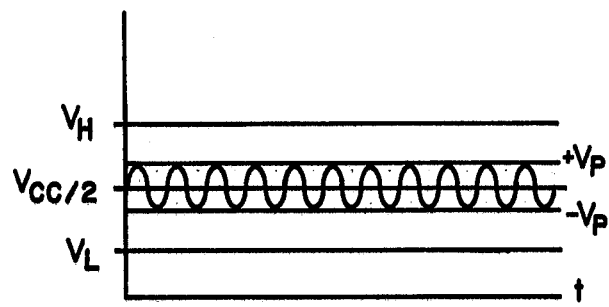
FIG. 3 shows voltage ranges for illustrating the function of the embodiment of FIG. 1.

In operation, the output voltage developed across sensor coil 12 and which is applied at junction 20 is a function of frequency and increases linearly at a 6 dB/octave rate as illustrated by transfer characteristic 36 of FIG. 2. The output voltage from sensor 12 is attenuated by the low pass filter network. As illustrated by transfer characteristic 38 of FIG. 2, the magnitude of voltage developed across the low pass filter and which is applied to comparators 30 and 32 is also a function of frequency having a constant output magnitude until the break point of the filter is reached, as is known, and then decreases at a 6 dB/octave rate as the frequency of the voltage appearing across sensor 12 increases. Therefore, by selecting the time constant of the low pass filter, as illustrated by transfer characteristic 40 of FIG. 2, the magnitude of the voltage applied to the inputs of comparators 30 and 32 will increase at a linear rate determined by sensor coil 12 until the frequency thereof approaches the time constant of the low pass filter after which the output voltage thereat remains essentially constant. The reason that the output voltage remains essentially constant, after the break point of the low pass filter has been reached, is that although the voltage appearing across sensor coil 12 is increasing, the transfer function of the filter produces an output decreasing at the same rate which causes the sum of the two voltages to become substantially constant. Thus, by determining the respective values of capacitor 26 and resistors 24, 28 the output voltage ($V_P$) from the low pass filter has a maximum amplitude which does not increase after the frequency becomes greater than the time constant of the low pass filter. Because one end of sensor coil 12 (junction 14) is held at a fixed voltage potential, the magnitude of the voltage applied to comparators 30 and 32 will, in normal operation, be limited to a predetermined potential range as shown in FIG. 3 and which is equal to ($V_{CC/2} \pm V_P$).

As long as the voltage potential applied to comparator 30 is above the reference potential, $V_L$, there will be no signal output from comparator 30. However, as long as the voltage potential which is also applied to comparator 32 is below the reference potential $V_H$ there will be no signal output from this comparator either. Therefore as long as the output voltage from the low pass filter is in a normal operating range there will be no failure signal produced at the output of OR gate 34.

However, if junction 14 or 20 should be shorted to a ground reference potential such as might be caused by the winding of sensor coil threat being shorted to the chasis of the vehicle (for negative ground systems), the output voltage magnitude from the low pass filter will become essentially $+ V_P$ which is less than $V_L$ for a period of time and an output signal will be produced at the output of comparator 30. The output signal from comparator 30 is gated through OR gate 34 and indicates a failure in the anti-skid control system. If terminal 14 or 20 should be short circuited to the power supply voltage $V_{CC}$ (equivalent to shorting to the chasis with a positive ground system), the output voltage magnitude at the output of the low pass filter will become greater than the $V_H$ during some time integral and an output signal will be produced at the output of comparator 32. Accordingly this signal is gated through OR gate 34 and also produces a failure signal.

A final failure mode occurs if the sensor coil should be open circuited. If this condition arises, the voltage at the output of the low pass filter is pulled to ground potential since there is no supporting potential through the sensor coil. Since the input voltage to comparator 30 is less than $V_L$ comparator 30 is rendered operative for producing a fault indication signal at the output of OR gate 34. It is envisioned that the output of OR gate 34 can be applied to a fault indication circuit which would turn on a false indicator to indicate to the driver that there is a fault in the anti-skid control system.

What has been described above, is a fault detection circuit for indicating any one of a variety of modes of failure which might occur in the sensing circuit of an anti-skid control system for warning the driver of a vehicle in utilizing such a control system. Knowing that the anti-skid control system is then nonoperative, the driver is aware that the braking system of the vehicle is controlled by the mechanical breaking system and can adjust accordingly. Moreover, the low pass filter is suitable for filtering any unwanted noise transients from being coupled to the anti-skid control system which would otherwise have deleterious effect thereupon.

What is claimed is:

1. A fault detecting circuit for an anti-skid control system which is adapted to be operatively coupled to a sensing means thereof that includes a sensing coil, the fault detecting circuit being suitable for detecting open circuit or either end shorted to ground conditions of the sensing coil, the fault detecting circuit comprising:

bias supply means connected to a first terminal of the sensing coil, said bias supply means buffering said first terminal from ground reference potential for providing a predetermined bias potential thereat;

first circuit means connected to a second terminal of the sensing means which has a predetermined frequency transfer characteristic for providing an output signal having an amplitude which is limited within a predetermined range under normal operating conditions of the anti-skid control system, said output signal being outside said predetermined range when either of said first and second terminal of the sensing coil is short circuited to said ground reference potential or said sensing coil is open circuited; and second circuit means connected to said first circuit means being responsive only to said output signal therefrom falling outside said predetermined range for sensing open or short circuit conditions of the sensing coil.

2. The fault detecting circuit of claim 1 wherein said second circuit means includes means for providing a high amplitude signal and means for providing a low amplitude signal, said high amplitude and low amplitude signal respectfully falling above and below said range of amplitudes defined by said predetermined range of amplitude of said output signal of said first circuit means; and means for comparing the output of said circuit means to said high amplitude voltage signal and said low amplitude voltage signal for detecting the open and shorted conditions of said sensing means selectively.

3. The fault detecting circuit of claim 2 wherein said comparing means includes:
   first comparator means being adapted to receive said high amplitude signal and said output signal from said first circuit means for producing an output signal at an output thereof when the amplitude of said output signal from said first circuit means becomes greater than said high amplitude signal;
   second comparator means being adapted to receive said low amplitude signal and said output signal from said first circuit means for producing an output signal at an output thereof when the amplitude of said output signal from said first circuit means becomes less than said low amplitude signal; and
   gating means coupled to said outputs of said first and second comparator means for producing a fault signal in response to either said output signals from said first and second comparator means.

4. Fault detector circuit suitable to be fabricated in monolithic integrated circuit form which is adapted to be coupled to a sensor coil of a sensing system for detecting fault conditions to the sensor coil comprising:
   bias means including resistive divider means for providing a predetermined bias potential at an output thereof, said output being isolated from ground reference potential and adapted to be connected to a first terminal of the sensor coil;
   circuit means adapted to be connected to a second terminal of the sensor coil and having a predetermined circuit transfer characteristic for providing an output signal therefrom in response to the applied output signal provided from the sensor coil, the magnitude of said output signal from said circuit means being limited within a predetermined range during normal system operation, said output signal from said circuit means being caused to fall outside said predetermined range in response to the sensor coil being either open circuited or either terminal thereof short circuited to said ground reference potential;
   first comparator means coupled to said circuit means for comparing the output signal from said circuit means to a predetermined first voltage level to produce an output fault indicating signal in response to the sensor coil being open circuited; and
   second comparator means coupled to said circuit means for comparing the output signal from said circuit means to a predetermined second voltage level to produce an output fault indicating signal in response to the sensor coil having either terminal being short circuited.

5. The fault detector circuit of claim 4 wherein:
   said circuit means comprises a low-pass filter network.

* * * * *